United States Patent [19]

Wiese

[11] Patent Number: 5,082,236

[45] Date of Patent: Jan. 21, 1992

[54] TABLET OR CAPSULE DROP TUBE ASSEMBLY

[75] Inventor: Delmar R. Wiese, Springfield, Mo.

[73] Assignee: Custom Metalcraft Inc., Springfield, Mo.

[21] Appl. No.: 549,915

[22] Filed: Jul. 9, 1990

[51] Int. Cl.[5] .............................................. F16K 7/02
[52] U.S. Cl. ......................................... 251/5; 137/613
[58] Field of Search ............................. 251/5; 137/613

[56] References Cited

U.S. PATENT DOCUMENTS

| | | | |
|---|---|---|---|
| 2,291,912 | 8/1942 | Meyers | 251/5 X |
| 2,604,246 | 7/1952 | Hood | 251/5 |
| 3,397,860 | 8/1968 | Bushmeyer | 251/5 X |

Primary Examiner—John C. Fox
Attorney, Agent, or Firm—Nies, Kurz, Bergert & Tamburro

[57] ABSTRACT

A drop tube assembly for feeding particulate material such as tablets or capsules between an upper level and a lower level is disclosed. The assembly employs a pair of vertical tubes, including an outer tube and a flexible inner tube. The flow of particulate material is controlled by introducing air under pressure between the tubes so as to reduce the diameter of the inner tube and thus constrict the vertical passageway interior of the inner tube. The flexibility of the inner tube and the pressurized air flow are controlled to allow the passageway to be closed initially along approximately 80 to 90 percent of the length of the tube. Air may be exhausted to open the passageway. The length and number of tubes in series can be varied depending on the length of the drop as well as the fragility of the material.

5 Claims, 2 Drawing Sheets

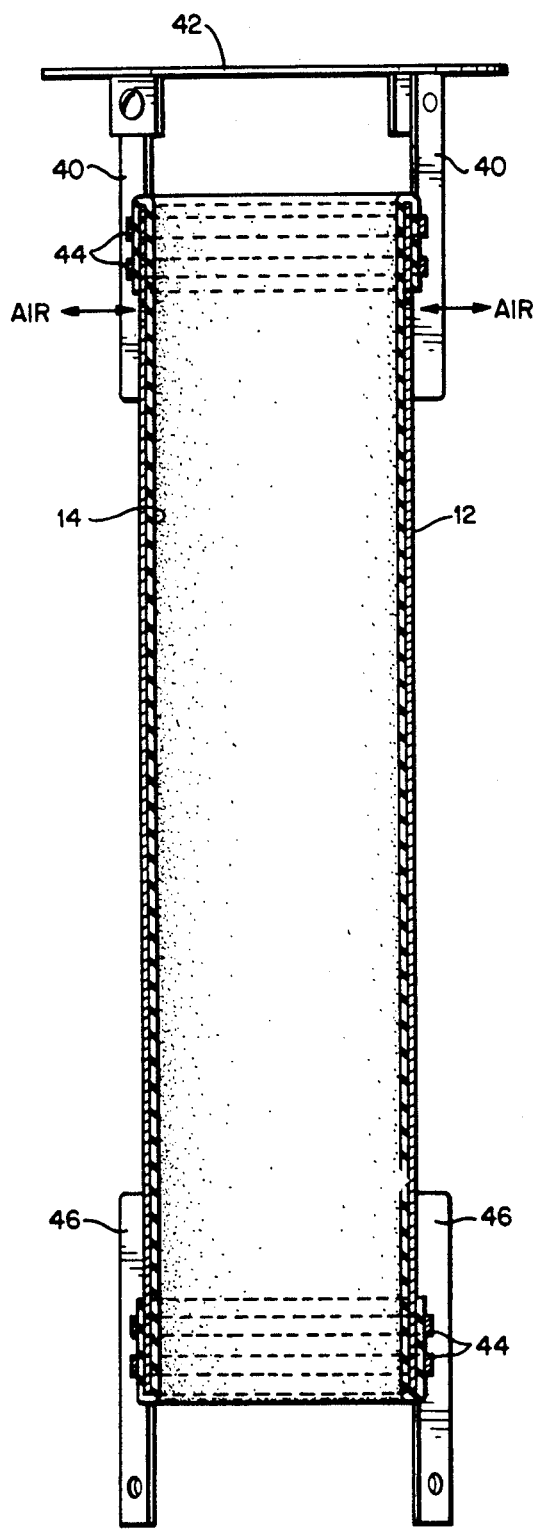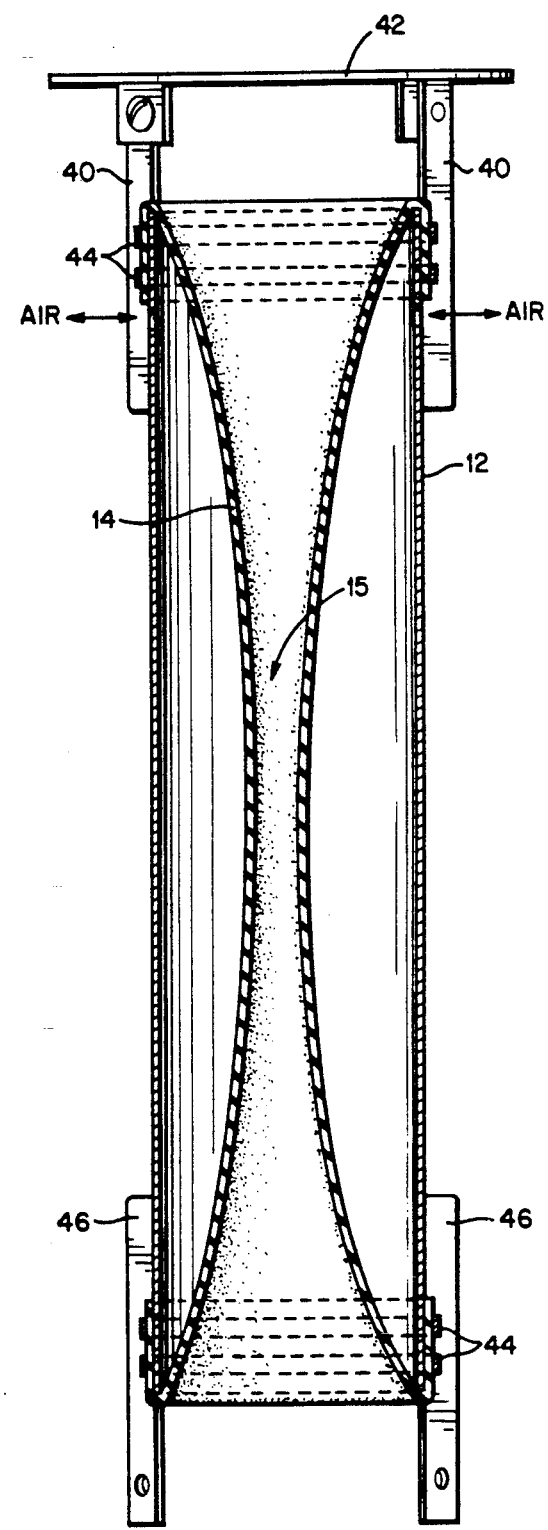

TABLET OR CAPSULE DROP TUBE ASSEMBLY

BACKGROUND AND SUMMARY OF THE INVENTION

The present invention relates to apparatus for controlling the flow of particulate material. More particularly, the present invention relates to apparatus which allows the vertical flow of tablets or capsules through a tube or other vessel to be controlled without breaking the tablets or crushing the capsules.

Previous apparatus for use in filling containers so as to protect the particulate material being filled are described in the following U.S. Pat. Nos.: 2,590,215 to Sausa; 2,598,207 to Bailey et al.; 2,604,246 to Hood; 2,716,575 to Vickers; 3,260,285 to Vogt; 3,415,485 to Hirs et al.; and 4,785,841 to Breckner.

By the present invention, there is provided an improved device which functions as a tablet or a capsule drop tube assembly so as to control and provide for a gentle downward flow of tablets or capsules through a tube or other vessel without breaking the tablets or crushing the capsules. The present invention employs a double tube arrangement, including a flexible tube which is of a uniform or consistent thickness throughout its length and is employed to control the flow of tablets by restricting flow along the vertical length of the tube or by completely closing off the flow.

The flow of tablets or capsules is controlled by introducing air under pressure between a pair of vertical tubes, including an outer tube and a soft, flexible inner tube. This introduction of air causes the inner tube to collapse and thus restrict flow along the passageway interior of the tube. The degree of flow restriction is determined by the amount of air which is introduced or exhausted. Because the inner liner is soft and flexible, the control device does not break the tablets or crush the capsules. The soft, flexible inner tube employed in the present invention can be of any reasonable length, thus allowing the flow to be controlled over a considerable length or area rather than at just a single point.

BRIEF DESCRIPTION OF THE DRAWINGS

FIGS. 3 and 4 are cross-sectional views of the upper portion of the drop tube assembly of FIG. 1, showing the inner tube in the deflated and partially inflated conditions, respectively.

DESCRIPTION OF THE PREFERRED EMBODIMENTS

Figure 1:
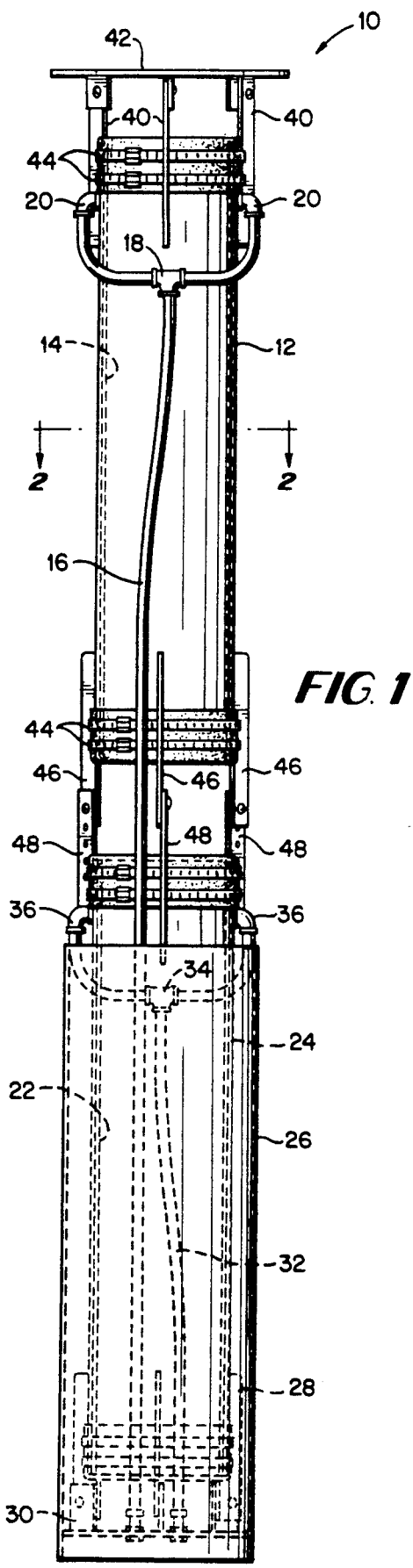
FIG. 1 is a side elevation of a tablet and capsule drop tube assembly in accordance with the present invention.

In the embodiment of the invention as shown in FIGS. 1 through 4, there is provided a tablet and capsule drop tube assembly 10 having an outer tube or sleeve 12 and a soft and flexible inner tube or sleeve 14 at the upper end portion. The flexible tube 14 is of a uniform or consistent thickness throughout its length and is employed to control the flow of tablets or completely closing off flow.

The outer tube 12 is secured at the top to mounting brackets 40 having a plate member 42 attached at the upper end. Hose clamps 44 are secured at the upper and lower ends to maintain an airtight condition between the inner 14 and outer 12 tubes.

As shown in FIG. 1, the inner 14 and outer 12 tubes are located in the upper portion. The outer tube 12 may be of a material such as aluminum. The inner tube 14, of a material such as natural gum rubber for a high degree of flexibility, can be inflated so as to constrict the interior passageway 15 as shown in FIG. 4. This is accomplished by passing air under pressure into the airtight space between the inner 14 and outer 12 tube so that pressure is applied against the outer periphery of the inner tube 14. The air under pressure may be obtained through an air hose 16 which extends from a multiple port valve at the lower end of the assembly 10 through tee fitting 18 and being connected in fluid engagement with the interior of the tube 12 through a pair of fittings 20 located 180 degrees apart on opposite sides of the tube 12. In one embodiment, the inner tube 14 was of a material having a uniform thickness of about 3/16 inch.

The flow of air under pressure is controlled in conjunction with the flexibility of the inner tube so that the passageway interior of the inner tube will be initially closed as required for the particular feed material being processed. In one embodiment, the inner tube 14 was initially closed along approximately 80 to 90 percent of its length. As the feed material is allowed to pass into the tube assembly, the constricted inner tube will gradually open under the weight of the feed material to allow the feed material to move downwardly. The air under pressure is allowed to exhaust as necessary through the air hose 16 via the multiple port valve to increase the flow. The multiple port valve may be controlled either manually or automatically such as by a solenoid or other device known in the art.

Depending upon the length of the drop and the fragile nature of the product, a plurality of tube assemblies may be employed, one above the other. Thus it is within the scope of the invention to use a single tube assembly or a plurality of such tube assemblies. Upon exiting from the uppermost tube into a lower tube, the product will move more slowly through the lower tube and the air pressure and exhaust are utilized to control the flow.

Figure 2:
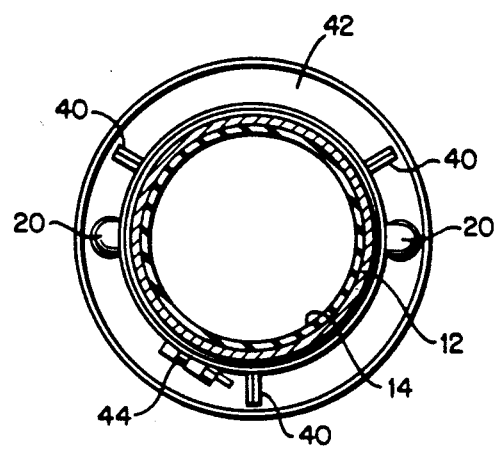
FIG. 2 is a cross-sectional view taken along line 2—2 of FIG. 1.

In the lower portion as shown in FIGS. 1 and 2, an inner 22 and outer 24 tube or sleeve are provided, and with the inner sleeve or tube 22 being inflatable in a similar manner as for the upper portion. The outer tube 24 is connected to the upper portion of the assembly by mounting brackets 48 which are secured to brackets 46 on the upper portion, as shown in FIG. 1. Hose clamps 50 are employed at each end of the lower portion of the assembly to maintain airtight conditions between the inner 22 and outer tube 24. In this lower portion, a third tube 26 is located outwardly at the bottom, for protection or to allow for a connection to a base or floor. A bottom or flange 28 is provided with upright feet 30 which connect to the bottom of the lower inner tube 22. The inner tube 22 is of a similar material as tube 14 in the upper portion of the assembly 10. The outer tube 24 may also be of a similar material as in the upper portion and the third tube 26 may be of stainless steel or other durable material.

In the lower tube assembly, an air hose 32 extends upwardly from a separate multiple port valve through tee fitting 34. The air hose 32 is connected in fluid engagement with the interior of the outer tube 24 through fittings 36 located o opposite sides of the tube 24. The lower tube assembly as shown and any additional tube assemblies which are employed will operate in a manner similar to the upper tube assembly previously described.

A continuous opening or passageway extends through the vertical center of the entire assembly during that time when one of the inner tubes is not closed off entirely. After passing through the lower tube portion, the feed material passes into a receiving hopper.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A tablet or capsule drop tube assembly including upper and lower portions, each portion comprising:
    an outer tube;
    an inner tube of a flexible material of uniform thickness throughout the length thereof secured to said outer tube at opposite end portions so as to provide an airtight chamber between said inner and outer tubes;
    means for introducing air under pressure between said inner and outer tubes to cause a passageway interior of said inner tube to be constricted;
    means for exhausting air from between said inner and outer tubes; and
    means for sequentially actuating the two portions.

2. The drop tube assembly of claim 1 wherein said inner and outer tubes are substantially parallel prior to introduction of air under pressure.

3. The drop tube assembly of claim 1 wherein said inner tube is of a material such as to be initially constricted along approximately 80 to 90 percent of its length upon introduction of air under pressure.

4. The drop tube assembly of claim 1 wherein said inner tube is constructed of natural gum rubber.

5. The drop tube assembly of claim 4 wherein said inner tube is of a material having a uniform thickness of about 3/16 inch.

* * * * *